United States Patent [19]

Missig et al.

[11] Patent Number: 5,084,313
[45] Date of Patent: Jan. 28, 1992

[54] INSULATING MATERIAL AND METHOD OF MAKING SAME

[75] Inventors: James R. Missig, Joliet; Frank J. Meyer, Chicago, both of Ill.

[73] Assignee: Meyer Tool and Manufacturing, Inc., Oak Lawn, Ill.

[21] Appl. No.: 670,175

[22] Filed: Mar. 15, 1991

Related U.S. Application Data

[63] Continuation of Ser. No. 285,641, Dec. 16, 1988, abandoned.

[51] Int. Cl.$^5$ .................. B65D 1/00; B32B 15/04
[52] U.S. Cl. .................. 428/35.8; 428/76; 428/215; 428/332; 428/457
[58] Field of Search ........... 428/457, 76, 35.8, 35.9, 428/215, 332, 34.1

[56] References Cited

U.S. PATENT DOCUMENTS

| | | | |
|---|---|---|---|
| 4,726,974 | 2/1988 | Nowobilski et al. | 428/76 X |
| 4,745,015 | 5/1988 | Cheng et al. | 428/76 X |
| 4,915,998 | 4/1990 | Parenti, Jr. et al. | 428/76 |
| 4,985,106 | 1/1991 | Nelson | 428/76 |

Primary Examiner—Thomas J. Herbert, Jr.
Attorney, Agent, or Firm—John L. Parker

[57] ABSTRACT

An insulating material is provided comprising an air tight enclosure maintained under vacuum and containing a plurality of alternate, successive layers of thin reflective foil and thin insulating sheeting. These layers are tightly packed together and are arranged generally perpendicular to the heat flow. The enclosure walls are thin and sufficiently ductile or resilient so that when air is pumped from inside the enclosure, the walls deform in response to atmospheric pressure and transmit this load to the layers of foil and sheeting thereby compressing them tightly together. A method of making such an insulating material is also provided, by wrapping multiple layers of laminated insulating components around a thin inner wall of the enclosure, covering and enclosing the layers and inner wall with thin outer walls of the enclosure, and subjecting the enclosure to a vacuum causing the thin enclosure walls to deform under atmospheric pressure and compress the insulating components together to thereby form a consolidated, rigid structural member having high performance insulating qualities.

7 Claims, 4 Drawing Sheets

INSULATING MATERIAL AND METHOD OF MAKING SAME

This application is a continuation of our application Ser. No. 07/285,641, filed Dec. 16, 1988, now abandoned.

BACKGROUND AND OBJECTS OF THE INVENTION

This invention relates generally to insulating materials maintained under vacuum, and more particularly, to such materials which are light in weight and yet have high compressive strength, and possess superlative insulating qualities at extreme high or low temperatures.

It is an object of the invention to provide a light weight, high performance insulating material maintained under vacuum, for use under extreme high or low temperature service conditions. An allied object is to provide such an insulating material which itself has such high compressive strength that it has load bearing capabilities, thereby enhancing its use in many applications where use of heavy load bearing members is prohibited.

Still another object is to provide a method of making such an insulating material in which multiple layers of laminated insulating components are enclosed and subjected to a vacuum to thus compress the components and enclosure together to form a rigid, strong structural member having highly desirable insulating qualities.

SUMMARY OF THE INVENTION

We provide an insulating material comprising an air tight enclosure maintained under vacuum and containing a plurality of alternate, successive layers of thin reflective foil and thin fiberglass sheeting. These layers are tightly packed together and are arranged generally so as to be perpendicular to the direction of heat flow. The walls of our insulating enclosure are thin and sufficiently ductile or yielding so that when air is pumped from inside the enclosure, the walls deform in response to atmospheric pressure and transmit this load to the layers of foil and sheeting thereby compressing them tightly together. In this way, the layers retain their insulating quality while supporting atmospheric load. We also provide a method of making such an insulating material by wrapping multiple layers of laminated insulating components around an inner wall of the enclosure, covering and enclosing the layers and inner wall with outer walls of the enclosure, and subjecting the enclosure to a vacuum causing the enclosure walls to deform and compress the insulating components and enclosure walls together to thereby form a rigid, strong structural member having highly desirable insulating qualities.

DETAILED DESCRIPTION OF THE INVENTION

Figure 1:
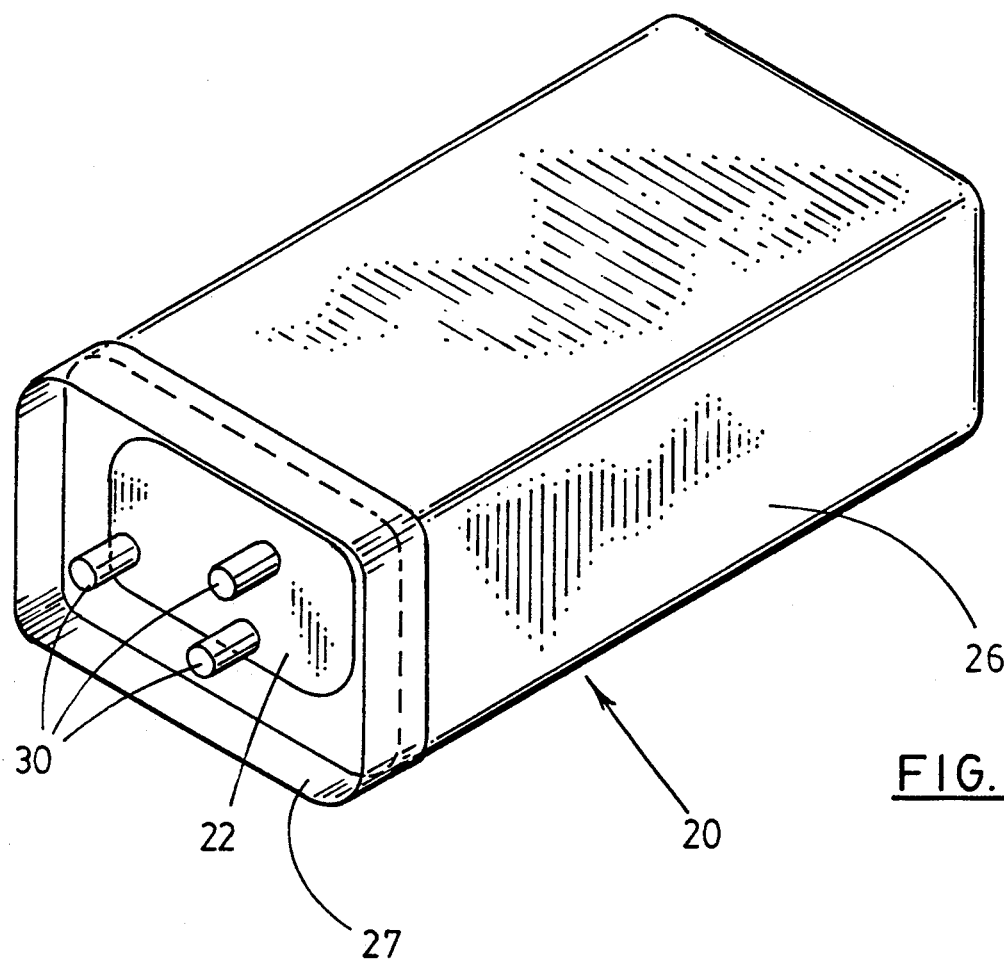
FIG. 1 is a perspective view of an illustrative battery encased within the insulating material of the present invention.
Figure 2:
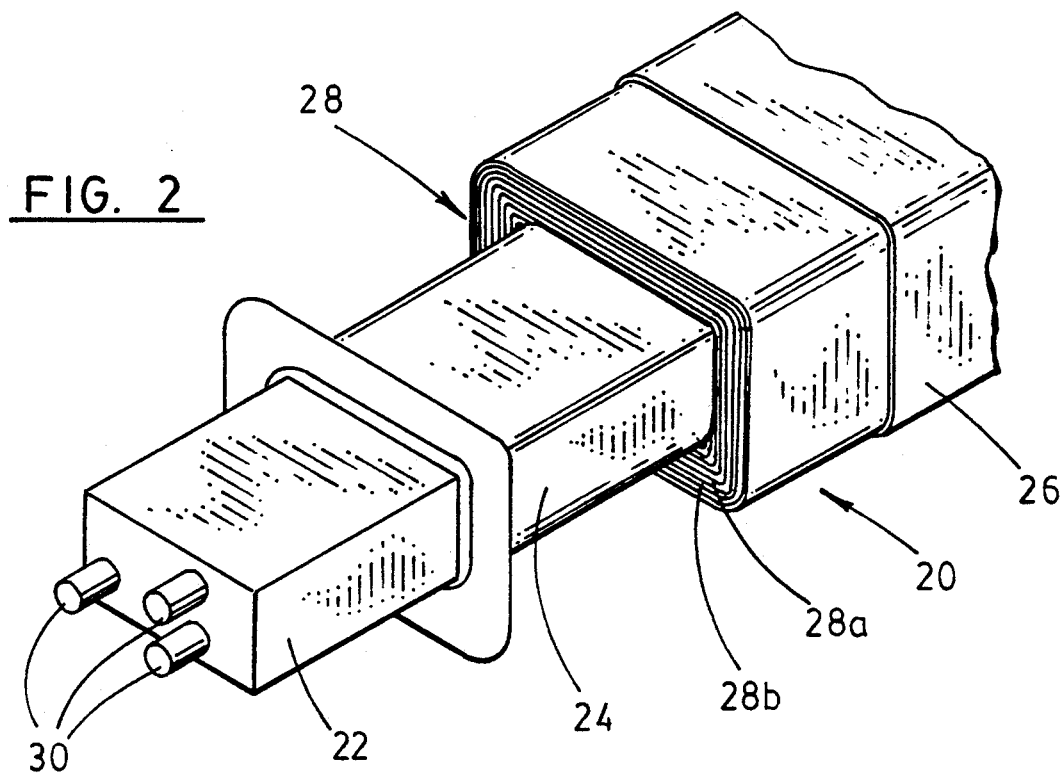
FIG. 2 is a perspective view showing the relationship between the components of the illustrative insulating material, and showing the relationship between this material and an illustrative battery to be insulated by it, showing the battery partially extended from the material.
Figure 3:
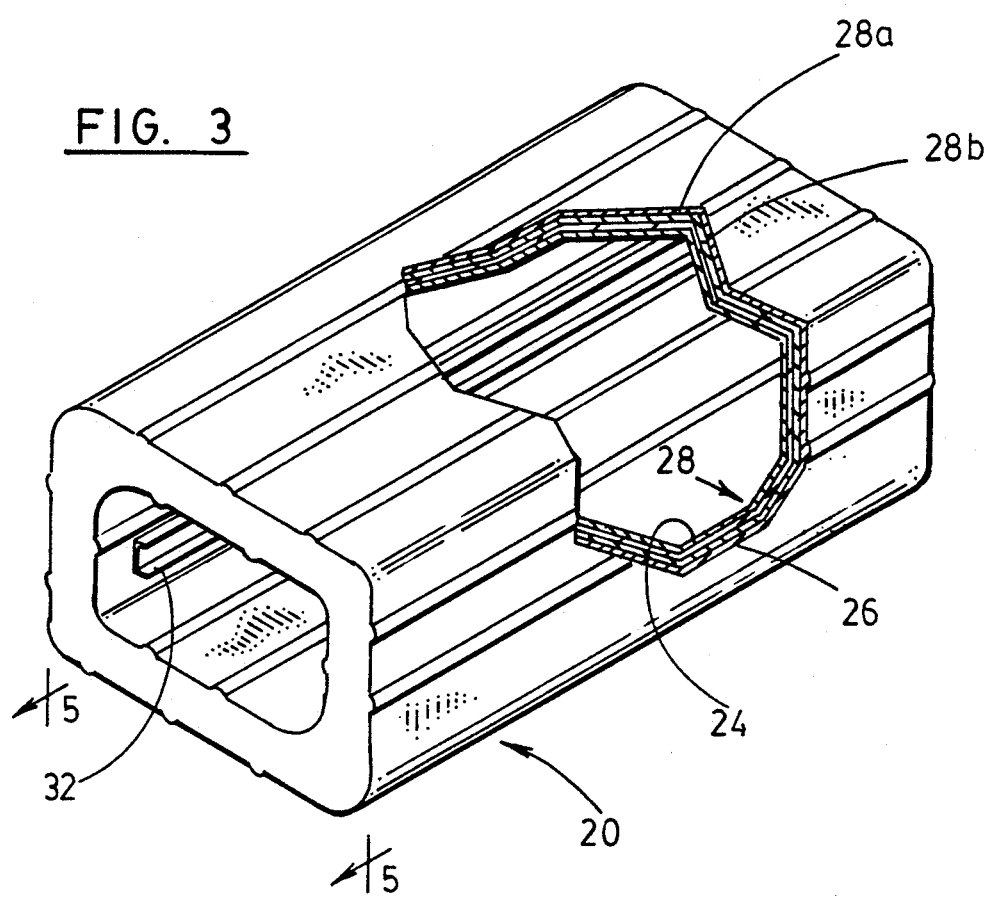
FIG. 3 is a perspective view of the illustrative insulating material, showing in cut-away fashion the general appearance of the layers of insulating components.
Figure 6:
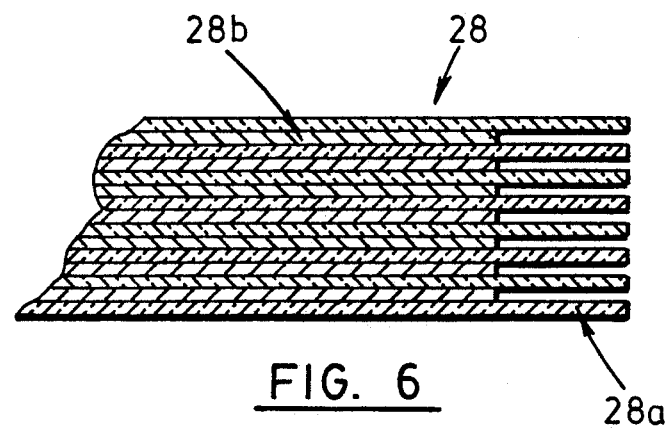
FIG. 6 is an enlarged cross-sectional view of the encircled portion of FIG. 4.
Figure 7:
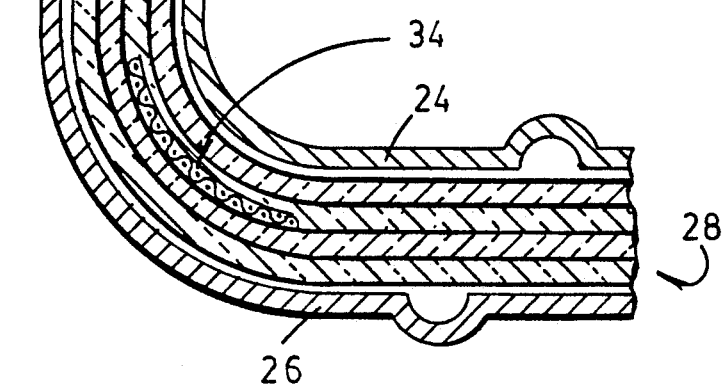
FIG. 7 is an enlarged cross-sectional view of the encircled portion of FIG. 5, this time depicting the insulating material in place including the screen used for vacuum pumping.

Turning now to the drawings, the illustrative insulating material takes the form of an insulating enclosure or container 20 for a battery 22 or like device which is required to be insulated so that it will function at extremely high or extremely low temperatures. The illustrated enclosure 20 is an insulated box open at one end (upper end) for insertion therein of the battery 22. Typically, the enclosure 20 is sized and shaped so that the battery or the like closely fits within it in order to maximize the effectiveness of the insulation provided by the box. In this instance, the insulating box 20 has thin inner and outer walls or shells 24, 26, respectively, spaced apart to create a space therebetween for the specially constructed insulation components, as described below. A cover 27 may be provided for the battery.

The main steps in constructing the illustrative insulating container or box 20 are as follows. An inner shell 24 is constructed of thin stainless steel sheet, for example on the order of 0.020" thick, with the inside dimensions of this shell being selected to fit the particular battery or other object to be held in the container. The inner shell 24 is tested for leaks to make sure that all joints are gas tight. Next, layers of special insulation components (see 28) are wrapped around the outer periphery of the shell as described below. Then the wrapped inner shell 24 is subjected to a vacuum, causing its outer periphery to shrink to a predetermined point so that the outer shell 26 will fit over the wrapped inner shell. Finally, the outer shell 26 is formed over the wrapped inner shell 24, utility connections 30 for the battery (e.g., electrical terminals, heat input) are supplied, and the insulating enclosure is ready for service.

A detailed description of the construction of the illustrative insulating container 20 follows. To facilitate this construction, we have found it useful to employ a winding machine (not shown) having means for rotating the mandrel upon which the inner shell components are mounted. The mandrel is preferably slightly expandable/contractible radially to facilitate its removal from the completed container. In this instance, the mandrel has the shape of a rectangular solid, i.e., conforming generally to the shape of the battery to be encased. Two sheets of thin stainless steel are wrapped around the mandrel, being sized so that together they completely enclose the mandrel and form the walls 24a, 24b, of an open-ended enclosure. One such sheet 24a is clamped or banded around the upper half of the mandrel, which is radially contracted to its collapsed or smaller size. This sheet is then tack welded to a pair of longitudinal rails 32 located on the inside of the shell 24 and which also form a channel for reception of the battery 22 therein. Preferably, the tack welding is begun at the longitudinal center of the sheets, and then worked outwardly to the ends. After the first sheet is tacked in place to the rails 32, the second sheet 24b is pulled tightly around the lower half of the mandrel. It is also tack welded to the rails 32, taking care to minimize heat distortion of the sheets during welding by alternate welding of spaced tack sites.

Figure 4:
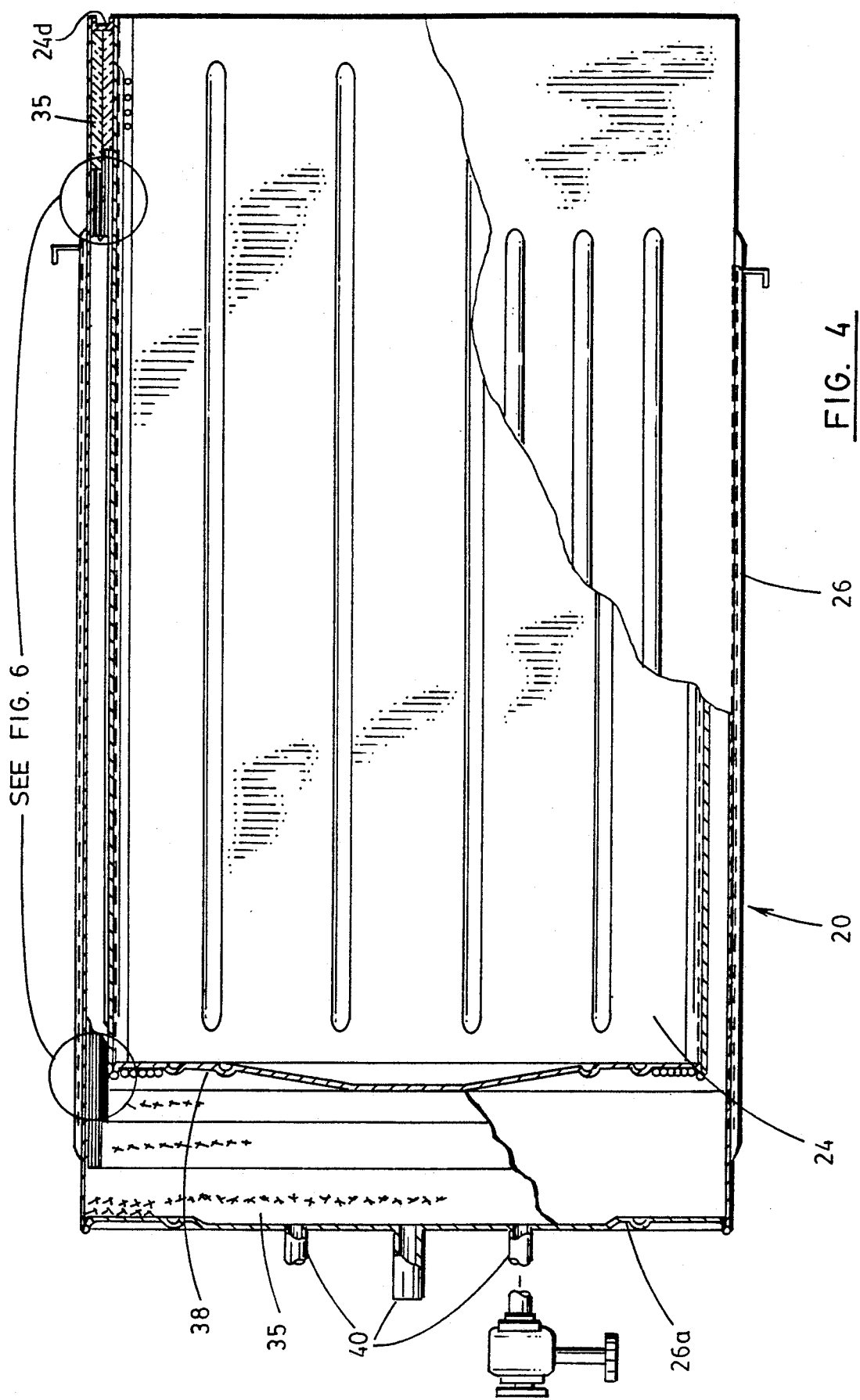
FIG. 4 is a vertical elevational view, partly in section, and partly cut-away, showing an illustrative insulating container of the invention.
Figure 8:
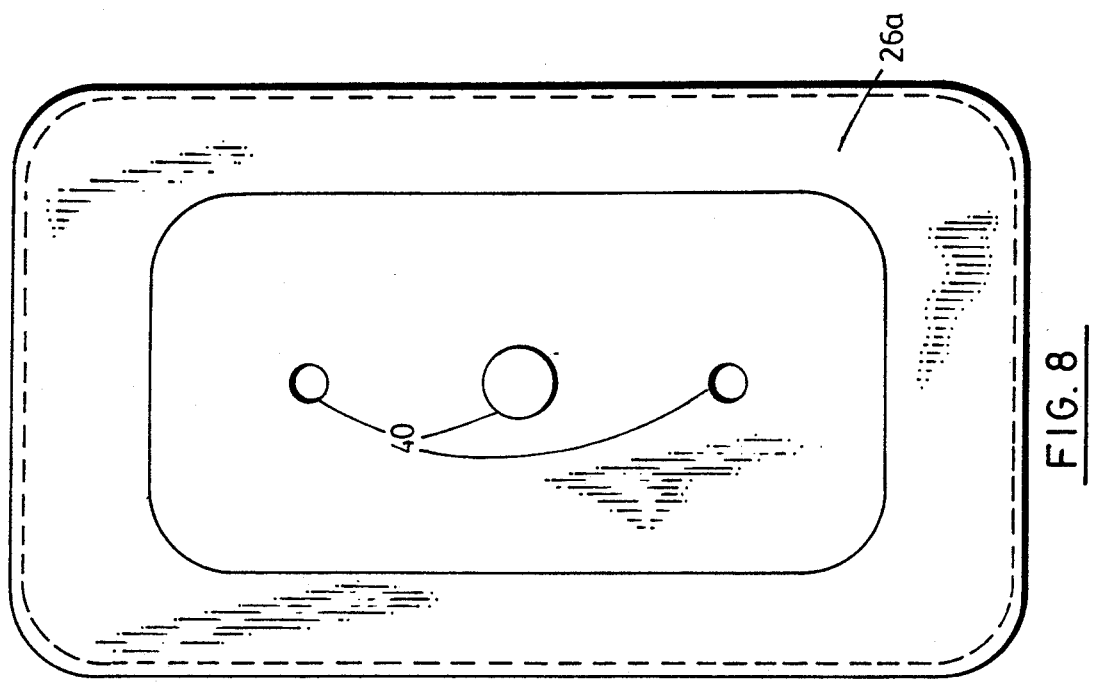
FIG. 8 is a vertical elevational view of the bottom end of the outer shell component of the illustrative insulating material of the present invention.

After the tack welding of both sheets or walls 24a, 24b to the rails 32 is complete, the mandrel is radially expanded slightly thereby tensioning the walls and expanding them to the final dimensions of the inner shell 24. Then, a bottom cover or wall 24c (see FIG. 4), formed of the same or similar thin stainless steel sheet, is cut to size to cover the bottom of the open ended shell 24, is fit onto the mandrel and is tack welded to the walls 24a, 24b. Again, tack welding of the bottom 24c to the side walls 24a, 24b, is preferably accomplished by starting at the longitudinal center of the bottom, and working outwardly toward its ends in order to minimize heat distortion of the thin steel sheets. A front flange 24d is welded to the walls 24a, 24b, at the upper end of the enclosure (see FIG. 4). When all seal welding is complete, the inner shell 24 is leak tested with the mandrel in place within it, using conventional helium mass spectrometer leak testing techniques. All welds are bagged (for example, enclosed with polyethylene sheeting) and flooded with helium gas to be certain that the welds are leak tight. This is important at this point in the procedure because leak testing and repair of the inner shell 24 is difficult to accomplish once the inner shell has been enclosed within the outer shell 26.

Layers of special insulating material 28 are then wound around the inner shell 24 with the mandrel still in place through use of the winding bench. In the illustrative insulating enclosure, two successive wraps around the shell 24 are made with stainless steel foil of 0.003" thickness. Heavy tension is applied to these wraps of foil using an air motor (not shown) as a braking system in order to assure that the foils tightly adhere to the shell 24. The two touching bare layers of metal foil advantageously enhance the tension applied through friction. Then, a series of alternating layers of insulating fiberglass paper or other inert insulating material such as mica (for example of about 0.00025" thickness) 28a, and reflective thin metal foil (for example, stainless steel of 0.0003" thickness) 28b are successively wound around the inner shell 24, followed by several (for example, seven) alternate combination layers of such fiberglass paper and metal foil. At this point the marginal ends of the stainless steel or other appropriate metal foils are tack welded to each other. Then, two successive wraps of thin aluminum foil, for example 0.0003" thick, are wound around the previous windings, followed by another series of perhaps 20 to 40 alternate layers of insulating fiberglass paper and reflective thin metal (aluminum) foil. The number of such layers may be selected depending upon the expected operating temperature and the heat loss or gain limitations of the particular application.

At this point, the fiberglass paper/metal foil alternate layers 28a, b are interrupted, and one full wrap of aluminum foil is wound around the shell 24. Then, stainless steel screens 34 are inserted in each of the corners of the shell. These screens create a gas path or channel within the insulation to facilitate later pumping out or removing of air from between the inner (24) and outer (26) shells. Two additional successive aluminum foil wraps are then added to the built-up shell 24. Now, this first blanket of insulation is complete.

We now add several additional similar blankets of insulating paper and reflective foil components. Each succeeding blanket is preferably started approximately ¾ out of circumferential alignment with the preceding blanket, to effectively block the path of heat flow. We use insulation board 35 to fill in any gaps. A second blanket is wound over the first, the second one having approximately 40 successive alternate layers of fiberglass paper and aluminum foil. Then the procedure previously described for inserting the stainless steel screens 34 is repeated. After completion of this second blanket, the procedure is repeated for two additional (third and fourth) blankets. A final blanket wrap is applied having, in this instance, 96 successive alternate layers of fiberglass and metal foil.

Figure 5:
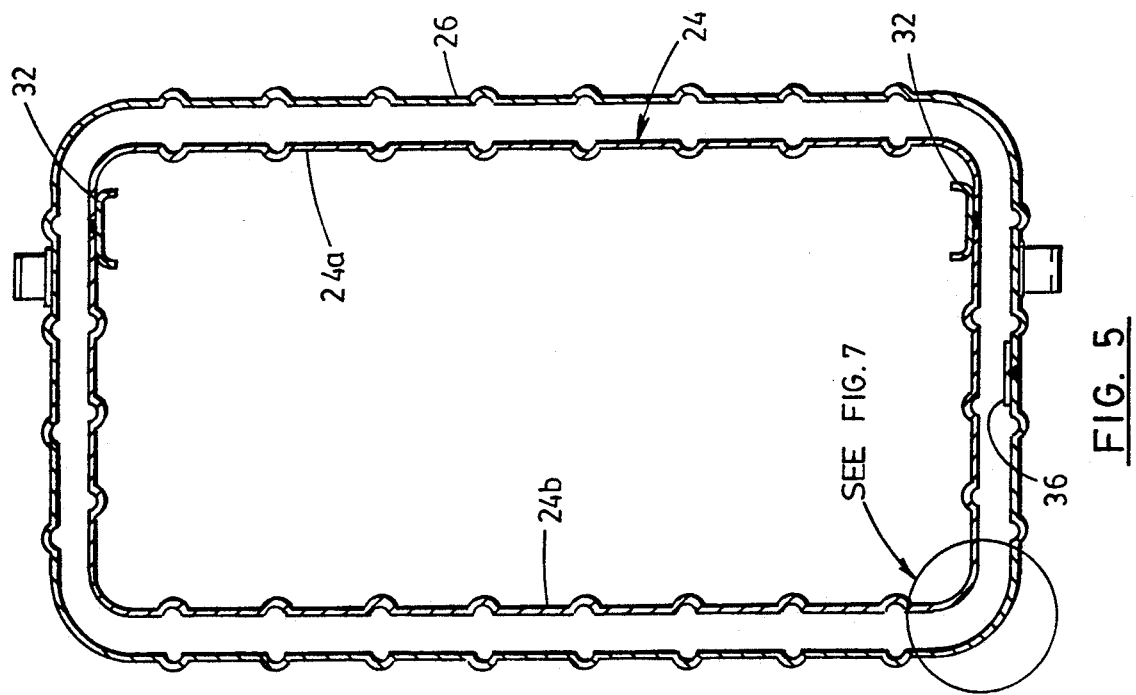
FIG. 5 is a cross section taken along the line 5—5 in FIG. 3 with the insulation not shown.

Following winding of the insulation blankets over the inner shell 24, the outer shell 26 is placed around the periphery of the wrapped insulation, and clamped or banded thereto using suitable bands. In this instance, the outer shell 26 is formed of stainless steel sheet of approximately 0.020" thickness. A vacuum bag, such as a plastic bag, is then placed around the entire wrapped outer 26 and inner 24 shell structure, and a vacuum (for example, 28" mercury) is drawn to deform the shells and thereby compress the insulation. In the process, the void spaces between the two shells 24, 26 are eliminated as air is withdrawn thereby forcing the layers of metal foil and fiberglass paper tightly together, rigidifying them such that the final composite insulated material has load bearing capabilities in addition to presenting superlative insulating qualities. With the vacuum maintained, the outer shell 26 is drawn onto the outer insulating blanket. Then, by mechanically maintaining the load, the marginal ends of the shell 26 are tack welded to a strip 36 (see FIG. 5) provided at the center. The abutting edges of the shell 26 are then welded to the strip 36.

Next, a getter basket 38 (FIG. 4) is placed against the surface of the bottom cover 24c (see FIG. 4), following which the four layers of insulating blankets are folded over the getter basket. One layer of insulation board 35 is added, and the insulation blankets are folded against the bottom cover 24c. The front flange 24d and bottom cover 24c are tack welded to the outer shell 26. Utility connections 40 for the enclosure are provided in the shell bottom 26a (for air pump out port, vacuum gauge, and auxiliary port). After completion of the welding, the insulating enclosure 20 is evacuated and leak tested in a conventional manner. Finally, the mandrel is removed from the completed box 20, and a final leak check is performed. Preferably, this final leak testing is completed using a helium mass spectrometer. We found the box 20 to be leak free in accordance with industry standards.

In the practice of our invention, the utilization of thin inner and outer enclosure walls, 24a, 24b, 24c, 26, 26a, made of ductile or yielding materials, makes it possible to bring about the desired deformity of the walls in response to atmospheric pressure resulting from application of vacuum to the inside of the enclosure. This deformity or inward collapse of the enclosure walls forces the layers of insulating components into a tightly consolidated insulating mass.

When the illustrative battery 22 is in place within the box 20, the insulated walls of the box are perpendicular to the heat flow emanating from the battery. We find through use of our invention that it is possible to achieve minimal heat leaks on the order of only about 100 watts at 400 degrees C. with an enclosure of approximately 15 square feet of surface area.

In practicing our invention, we find that heat transmission through our insulating components by radiation is minimized through provision of the reflective foils which function as a radiation shield, transmission of heat by conduction is prevented by carefully avoiding direct metal to metal contacts, and transmission of heat by convection is minimized by application of the vacuum to the insulating components.

In carrying out the invention, we have successfully used fiberglass paper having a basis weight of 16.1 grams per square meter, a thickness of 3.3 mils, an air permeability of 60 liters per minute per 100 square centimeters, and a tensile dry strength of 240 grams per 25 millimeters machine direction. Other insulators may be used as well, for example mica or woven or weblike cloth materials such as bridal veil.

It will also be recognized that reflective foil materials other than stainless steel and aluminum may be used in practicing our invention. In keeping with the need to reduce losses by radiation of heat, we find it advantageous to employ materials which are made of reflective metal or which have a reflective metal coating. For example, with low temperature systems, a thin plastic film (for example, on the order of 50 Angstroms) such as Mylar may be used if provided with a surface layer of a metal (such as aluminum, silver, gold). For very high temperature applications, metal alloys such as Inconel may be useful in practicing our invention. Stainless steel foils are useful for high and medium temperature applications, and inert synthetic films with metal coatings having reflective qualities are useful for lower temperatures or for cryogenic applications.

In selecting materials for use as the reflective metal foils and insulating sheeting, it is essential to choose materials having low outgassing properties and low vapor pressures so as not to impair maintenance of the vacuum. In the case of the battery enclosure described herein, the insulating materials and getter give assurance that the vacuum system for the enclosure will operate maintenance free for five years or more.

The features of our invention render it advantageous for use in many different applications. As explained above, our invention is useful for storage of batteries for electric vehicles. Another application is insulation of hot gas exhaust pipes or manifolds, for example automobile exhaust pipes, and insulation of turbine inlets. Our invention is especially useful in such applications because our insulating material has such light weight and takes up so little space. Other applications for our invention include cryogenic transporters, especially in situations where the weight of the cryogenic vessel is of overriding importance. It is, of course well known that it is difficult to construct a cryogenic vessel that is light in weight; our invention makes this possible.

We claim as our invention:

1. An insulating material comprising an air tight enclosure containing insulating components including a plurality of alternate, successive layers of thin reflective foil and thin insulating sheeting tightly packed together and arranged generally perpendicular to the direction of heat flow, wherein the interior of the air tight enclosure is subject of a vacuum which causes the enclosure to deform and compress the insulating components and the air tight enclosure together to thereby form a rigid and strong structural member having exceptional insulating qualities.

2. The insulating material defined in claim 1 in which the enclosure has walls that are sufficiently ductile to transmit atmospheric load to the layers of foil and sheeting in response to application of vacuum to the enclosure.

3. The insulating material defined in claim 1 in which the layers of foil and sheeting retain insulating capability while supporting load.

4. The insulating material defined in claim 1 in which the foil layers are of stainless steel or aluminum metal.

5. The insulating material defined in claim 1 in which the foil layers are of plastic resin carrying a reflective surface coating.

6. The insulating material defined in claim 1 in which the foil and sheeting layers have a thickness of about 0.0002 to 0.0003 inches.

7. The insulating material defined in claim 1 in which the enclosure walls are of stainless steel having a thickness of about 0.20 inches.

* * * * *